No. 710,483. Patented Oct. 7, 1902.
P. F. MACCALLUM.
INTERNAL COMBUSTION ENGINE.
(Application filed Feb. 13, 1902.)
(No Model.)
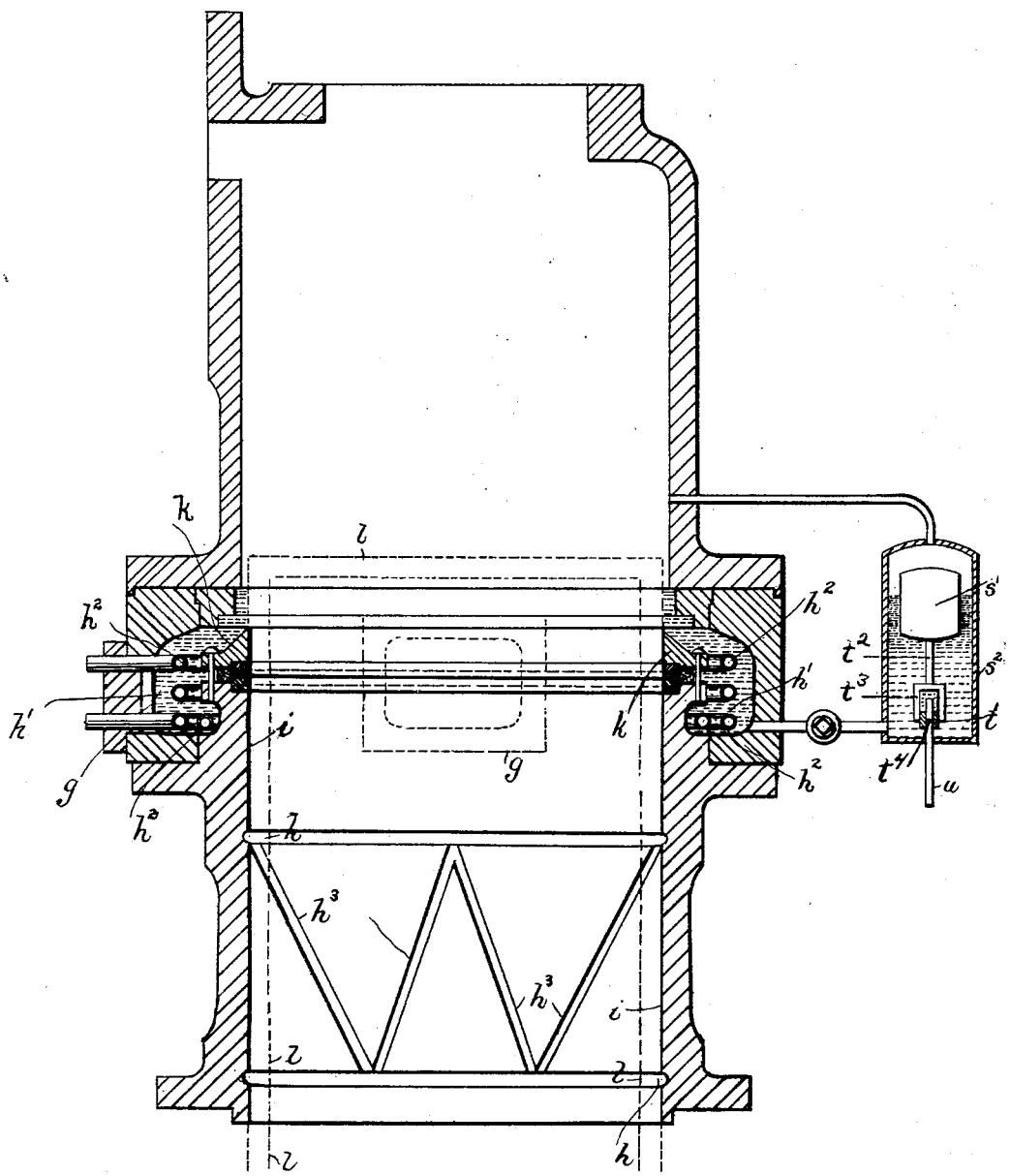

UNITED STATES PATENT OFFICE.

PATRICK FRASER MACCALLUM, OF FAIRBANK, HELENSBURGH, SCOTLAND.

INTERNAL-COMBUSTION ENGINE.

SPECIFICATION forming part of Letters Patent No. 710,483, dated October 7, 1902.

Original application filed May 7, 1901, Serial No. 59,128. Divided and this application filed February 13, 1902. Serial No. 93,953. (No model.)

*To all whom it may concern:*

Be it known that I, PATRICK FRASER MACCALLUM, a citizen of the United Kingdom of Great Britain and Ireland, residing at Fairbank, Helensburgh, Dumbartonshire, Scotland, have invented certain new and useful Improvements in Internal-Combustion Engines, (for which application for patent has been made in Great Britain, No. 18,242, dated October 13, 1900,) of which the following is a specification.

This application is a division of my earlier application, filed May 7, 1901, Serial No. 59,128.

This invention relates to that class of engines in which the impulse imparted to the piston is produced by the combustion within the cylinder of solid fuel or by the explosion of oil or gas; and it has for its object to provide means whereby the working cylinder and piston are maintained at a low temperature and lubrication of these parts is effectively carried out.

The invention is illustrated by the accompanying drawing, which shows in longitudinal vertical section a cylinder constructed in accordance with my invention and suitable for engines of the above-mentioned class.

In carrying out the invention I provide in proximity to the upper end of the working cylinder $i$ a water or other liquid holding annular recess or space $h'$, the water or other liquid in said space impinging constantly upon a portion of the circumference of the piston $l$ (shown in its lowest position in dotted lines on the drawing) during the entire stroke of the latter, the liquid-space $h'$ being provided with doors, such as $g$, so that access for examination and cleaning may be had to said space. The water in the liquid-space $h'$, which may be renewed by constant or intermittent circulation, as required, is freely exposed to the pressure of the air or gases in the engine, the cylinder above the water-space being enlarged to form a clearance for this purpose. An adjustable ring or scraper $k$ is placed in the large liquid-holding space $h'$ to sweep any adherent solid matter from the piston $l$, this scraping-ring $k$ being also arranged to act as a packing-ring or as a cover for one or more packing-rings, as shown. The automatic regulation of the liquid-level within the liquid-space $h'$ may be accomplished, as shown, by means of a float $s'$, situated in a casing $s^2$, containing water or other liquid and connected to the said space $h'$, said float $s'$ operating through a rod $t^2$ and yoke $t^3$, a sleeve $t'$ sliding on the liquid-inlet pipe $u$, as shown, or upon the outlet-pipe. The upper end of the pipe $u$ is closed, and it is provided in its side with an opening $t^4$, which is opened and closed by the movement of the sleeve. Annular grooves $h$ are also provided at other points in the length of the cylinder $i$, these grooves being provided for lubricating purposes and supplied with water or oil, and these grooves may be connected together by diagonal grooves $k^3$.

The water or other liquid in the large annular water-space $h'$ may be maintained constantly at a low temperature by placing within the liquid-space one or more coils of tubing $h^2$, as shown, through which water or other cooling agent may be circulated.

By the above-described arrangement an effective cooling or lubrication of the piston and cylinder of the engine is obtained.

Having now described my invention, what I claim, and desire to secure by Letters Patent, is—

1. In an internal-combustion engine, means for maintaining the working cylinder $i$ and piston $l$, at a low temperature and for keeping the piston $l$ free from grit and dirt, said means comprising in combination an annular water or other liquid holding space $h'$ formed in the working cylinder $i$ around the piston $l$ an expansion-cylinder of larger diameter than the piston $l$, doors $g$ for access to said liquid-space, and a packing and scraping ring $k$ to prevent downward leakage of water and access of dirt or grit to the walls of the working cylinder $i$.

2. In an internal-combustion engine, means for maintaining the liquid in the space $h'$ at a low temperature without excessive circulation of the free liquid, said means consisting of a coil or coils, of tubing $h^2$ situated within the said space $h'$ and through which water or other cooling liquid is circulated.

In witness whereof I have hereunto set my hand in presence of two witnesses.

PATRICK FRASER MACCALLUM.

Witnesses:
 WALLACE FAIRWEATHER,
 JOHN MORTON.